(12) United States Patent
Bello et al.

(10) Patent No.: US 6,251,465 B1
(45) Date of Patent: Jun. 26, 2001

(54) PROCESS FOR PRODUCING SHEETABLE POTATO DOUGH FROM RAW POTATO STOCK

(75) Inventors: Anthony Bamidele Bello, Plano; Christopher Patric Friend, Allen; Keith Eric Petrofsky, Plano, all of TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/441,828

(22) Filed: Nov. 17, 1999

(51) Int. Cl.⁷ .................................................. A23L 1/216
(52) U.S. Cl. .......................... 426/550; 426/473; 426/523; 426/560; 426/573; 426/637
(58) Field of Search .................................. 426/550, 560, 426/637, 473, 573, 520, 523

(56) References Cited

U.S. PATENT DOCUMENTS

| | | | |
|---|---|---|---|
| Re. 29,773 | 9/1978 | Wisdom et al. ........................ 426/49 |
| 3,282,704 | 11/1966 | Fritzberg . | |
| 3,692,537 | * 9/1972 | Gerkens ........................... 426/550 X |
| 3,835,222 | 9/1974 | Wisdom et al. ........................ 426/49 |
| 3,865,964 | 2/1975 | Kellermeier et al. .................. 426/307 |
| 3,966,983 | 6/1976 | Dexter et al. ........................ 426/439 |
| 3,998,975 | 12/1976 | Liepa ..................................... 426/550 |
| 4,005,139 | 1/1977 | Kortschot et al. .................... 426/550 |
| 4,126,706 | 11/1978 | Hilton .................................... 426/438 |
| 4,528,202 | 7/1985 | Wang .................................... 426/550 |
| 4,698,230 | 10/1987 | Willard ................................. 426/533 |
| 4,710,386 | 12/1987 | Fulger et al. ........................... 426/28 |
| 4,756,916 | 7/1988 | Dreher et al. ......................... 426/302 |
| 4,834,996 | 5/1989 | Fazzolare .............................. 426/302 |
| 4,873,093 | 10/1989 | Fazzolare .............................. 426/302 |
| 4,876,102 | 10/1989 | Feeney ................................. 426/550 |
| 4,970,084 | 11/1990 | Pirrotta ................................. 426/289 |
| 5,085,884 | 2/1992 | Young .................................. 426/611 |
| 5,104,673 | 4/1992 | Fazzolare .............................. 426/549 |
| 5,110,613 | 5/1992 | Brown .................................. 426/549 |
| 5,171,600 | 12/1992 | Young .................................. 426/550 |
| 5,188,859 | 2/1993 | Lodge .................................. 426/560 |
| 5,236,733 | 8/1993 | Zimmerman ........................ 426/611 |
| 5,320,858 | 6/1994 | Fazzolare .............................. 426/549 |
| 5,429,834 | 7/1995 | Addesso ............................... 426/549 |
| 5,441,758 | 8/1995 | Lewis ................................... 426/637 |
| 5,464,642 | 11/1995 | Villagran ............................. 426/439 |
| 5,464,643 | 11/1995 | Lodge .................................. 426/439 |
| 5,690,982 | 11/1997 | Fazzolare .............................. 426/550 |

* cited by examiner

*Primary Examiner*—Arthur L. Corbin
(74) *Attorney, Agent, or Firm*—Colin P. Cahoon; Carstens, Yee & Cahoon

(57) ABSTRACT

Methods for making improved flavor potato products by using raw potato stock as a starting material to form a sheetable dough. The methods comprise controlled processing steps that result in a potato gel suitable for sheeting or extruding. Use of raw potato stock greatly enhances the potato flavor of the snack product ultimately produced.

16 Claims, 4 Drawing Sheets

PROCESS FOR PRODUCING SHEETABLE POTATO DOUGH FROM RAW POTATO STOCK

BACKGROUND OF THE INVENTION

1. Technical Field

The present invention relates to methods for producing sheetable potato dough from raw potato stock and, in particular, processes for making potato dough based products incorporating raw potato stock in place of dehydrated potato flakes, resulting in improved flavor characteristics.

2. Description of Related Art

There are many advantages in the food processing industry to developing products that can be made using a dough as the starting material for the product. A dough product might be sheeted, formed, cut, extruded, or shaped if necessary. For example, tortilla chips use as a starting material a corn or masa based dough which is pressed through a sheeter device and then cut into individual chip shapes. The masa is sufficiently cohesive that it can be pressed into a thin sheet and placed onto a conveyor without tearing, and is thus referred to as a "sheetable" dough. Typically, cookie and cracker type snacks start as a flour based dough which is extruded and cut or sheeted and cut. Methods for producing wheat flour and corn flour based doughs that are suitable for sheeting and extruding are well known in the industry.

Potato based doughs typically use potato flour or dehydrated potato flakes as a starting material. Potato dough made from raw potatoes is not used in applications requiring sheeting or extruding, because the properties of the dough are not acceptable for this purpose. Specifically, potato dough made from raw potato products tends to adhere to processing equipment surfaces yet it does not maintain adequate cohesion for sheeting or extruding. Past attempts at making a sheetable potato dough from raw potato stock have failed, resulting in a dough that is of a paste consistency which is not suitable for forming into pressed sheets for cutting or forming.

Potato flour and potato flakes start with a raw potato product which is cooked and then dehydrated to a dry flour or flake consistency, thereby leaching many of the sugars and homogenizing the raw material. Unfortunately, much of the potato flavor is lost in such process. Consequently, when such flour or flakes are used as a starting material, flavor additives are typically incorporated to produce an edible end product, such as a chip like snack. However, a potato flour or potato flake based product has yet to be developed that closely emulates a potato chip made from raw potato stock.

Accordingly, a need exists for a process that incorporates as a starting material raw potato product into potato dough that results in a potato based product that is suitable for extruding and sheeting. By introducing the raw potato stock into the starting dough, the flavor of the end product should be greatly enhanced. The raw potato stock should replace dehydrated potato flour or flakes, thus providing a more natural potato product. At the same time, the process should produce a potato dough gel having handling properties suitable for use with standard food processing, sheeting, extruding and cutting devices.

SUMMARY OF THE INVENTION

The proposed invention comprises methods for preparing potato based products using a potato dough comprising raw potato stock. Despite the use of raw potato stock as a base ingredient in the potato dough, the dough is suitable for sheeting, extruding, and cutting, with similar processing characteristics to potato doughs based on potato flour or flakes. This is accomplished using several controlled processing steps in combination.

One embodiment of the invention starts with chip stock potatoes which are peeled and cut into quarter-inch slabs. The slabs of raw potatoes are then subjected to a controlled dehydration at 195° C. to a moisture content of between about 40 and 60%. The partially dehydrated slabs are then cooled and placed in a high-shear processor. The high-shear processor is used to chop the slabs, thereby acting as a mechanical cooker, to a controlled temperature and time end-point. This produces a flowable gel which is allowed to cool, for example, for 30–60 minutes to about 40–45° C. in one embodiment. An emulsifier containing oleic acid can be blended into the gel along with potato flakes or other starchy materials. Sugars, corn syrup, and salts can also be added. The dough is then mixed for a short period of time while adding water in order to develop a particulate, as opposed to lumpy, dough texture with an approximate moisture content of between 30–50%. This dough can then be pressed between rollers in a sheeting device, sheeted to thickness, and then cut to form a chip product. This chip product may then be form-fried or otherwise baked or fried to the desired end-point moisture level.

The end result is a formed potato-based product with enhanced potato flavor. This invention is particularly unique in its ability to utilize raw potato stock resulting in a sheetable potato dough. For the purposes of this application, a sheetable dough is a dough readily suitable for use in industry standard dough sheeting devices.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
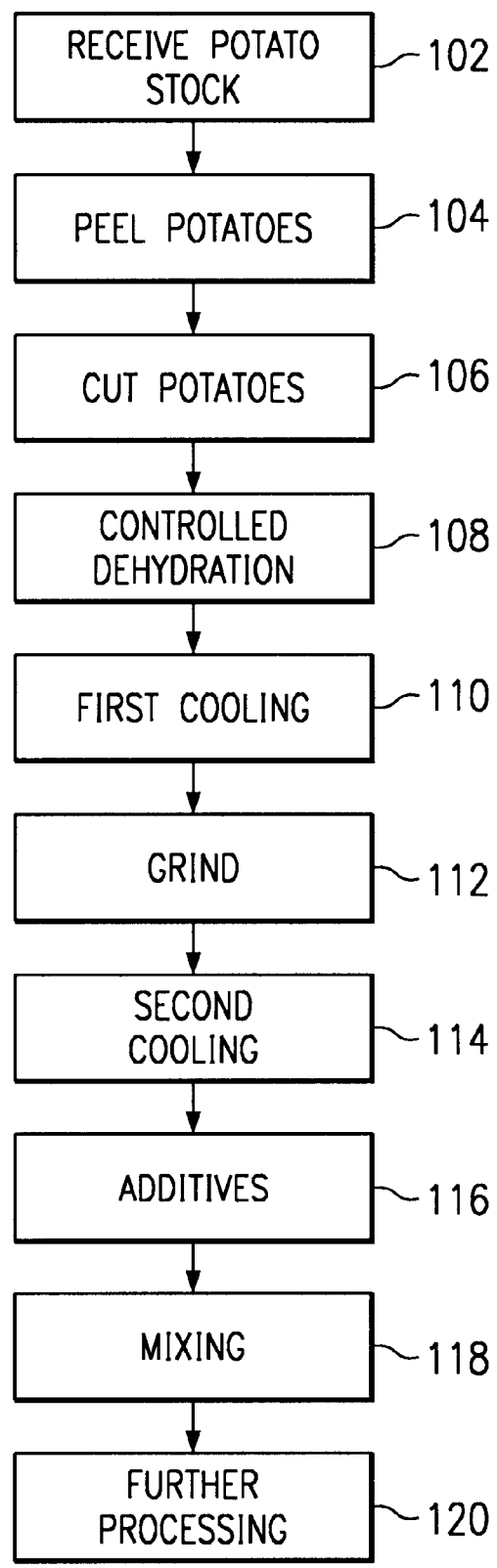
FIG. 1 is a flow chart of the method of one embodiment of the present invention.

FIG. 1 is a flow chart showing one embodiment of the present invention. The process starts with the receipt of raw potato stock 102. In one embodiment of the invention, chip-grade potato stock is used, thereby providing a uniform and predictable starting product. However, ordinary russet potatoes or other table stock potatoes might also be used, thereby reducing the cost of the initial potato stock. Some of the processing times and temperatures disclosed below may be adjusted to compensate for the use as a starting material of table stock potatoes.

The potatoes are peeled 104 to remove the potato skin. The potatoes are then cut 106. One embodiment to the invention involves cutting 106 the potatoes to a quarter-inch slab dimension. A french-fry cut, cube cut, or any other method for dividing the potatoes into smaller pieces can also be used at the cutting step 106.

The cut potato stock is then subjected to a controlled baking and dehydration step 108. This dehydration is accomplished, for example, by baking the product at about 195° C. for approximately 25 minutes. This baking could take place in batch or along a conveyor for the purposes of a continuous process. This controlled dehydration reduces the moisture content of the potato stock from about 75 to 85% initially to a partially dehydrated moisture content of between about 40 and 60%.

The partially-dehydrated potato stock is then subjected to a first cooling step 110. In one embodiment of the invention, the cooling takes place over a period of approximately 25 minutes to a temperature of approximately 70° C. A second embodiment involves a cooling step 110 of approximately 35 minutes to a temperature end-point of approximately 45° C. The timing of this first cooling step 110 and rate of cooling affects the ultimate character of the starch, the gelatinization and retrogradation of the product, and the gel formation. Therefore, the cooling time and temperature can be adjusted to produce the overall characteristics desired of the end product.

The potato stock is next chopped during a grind step 112. This grind step 112 in one embodiment is accomplished using a high-shear grinder having a sharp blade with a relatively high rotational speed, much like a traditional home food processor. This type of processing is referred to by Applicants as a "high-shear grind" or involving the use of a "high-shear processor." Because chopping with such a blade occurs at a high speed, heat is generated during the high-shear grind 112. Consequently, the grind step 112 interjects a mechanical cooking into the process. This high-shear grind 112 is conducted to a time and temperature end-point, typically 3 minutes and a resultant temperature of between 50° C. and 70° C.

It should be noted that temperature control throughout the steps described above is important to maintaining the appropriate processing properties of the end product. The potato stock at the end of the grind step 112 can best be described as a flowable gel at approximately 70° C. This gel has improved cohesion over potato stock that has been dehydrated without the controlled cooling disclosed herein.

Figure 2:
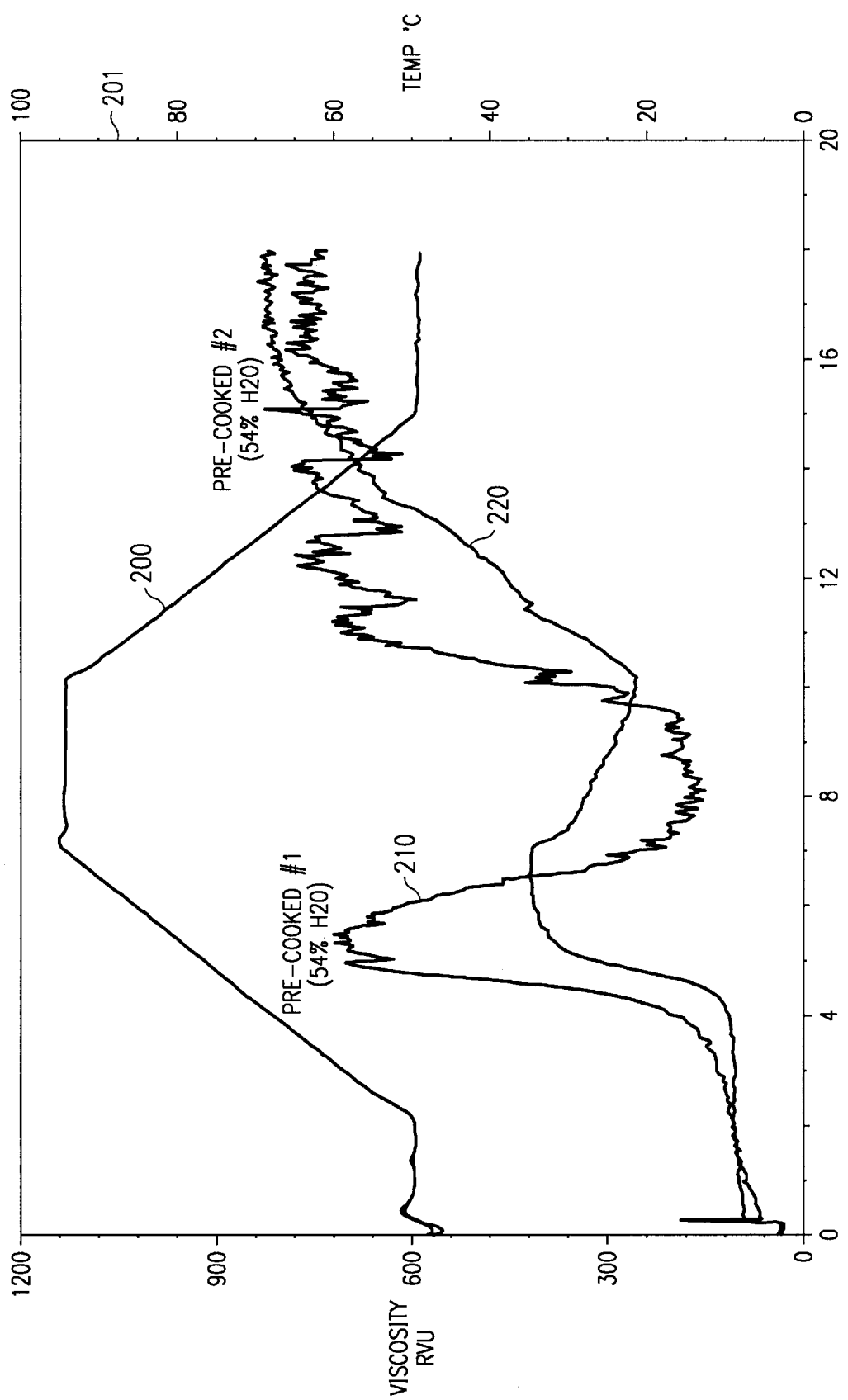
FIG. 2 is a chart showing the RVA profiles for two partially-dehydrated, pre-cooked potato samples exposed to the high-shear grind of the invention for different time periods.

FIG. 2 illustrates the critical nature of the grind step on the characteristics of the product of the invention. FIG. 2 is a chart showing the RVA profiles for two sample products after the grind step of the invention. RVA refers to Rapid Visco-Analyzer, which is an apparatus commonly used in the industry to characterize viscosity behavior. RVA profiles are well known in the food industry as a tool for investigating the hydration and gelling behavior of starches. The RVA method typically involves controlled heating and cooling of flour or starch suspensions in water at concentrations of between 5 and 40% w/w. A solid concentration of about 15% w/w was used for all of the RVA profiles found in FIGS. 2, 3, and 4.

As with the following figures showing RVA profiles, FIG. 2 shows a temperature reference line 200 reflecting the sample temperature over time charted against a temperature scale 201. The X-axis of FIG. 2 provides a time reference in minutes, while the Y-axis provides a viscosity measurement in RVU, which is a common viscosity unit related to RVA methods.

FIG. 2 shows an RVA profile 210 for a pre-cooked Sample No. 1 and an RVA profile 220 for a pre-cooked Sample No. 2. Both of the two samples were treated the same prior to the grinding step, being cooked to a 54% moisture. However, pre-cooked Sample No. 1 was ground in a high-shear grinder for one minute to an end temperature of 35° C. Pre-cooked Sample No. 2 was ground in a high-shear grinder for 3 minutes to an end point of 55° C. Pre-cooked Sample No. 1 exhibits poor sheetable characteristics. Pre-cooked Sample No. 2 is sheetable, but yields soft finished product texture. The differences in peak viscosity between the two samples are related to the differences between the starch granule structures of the two samples.

Figure 3:
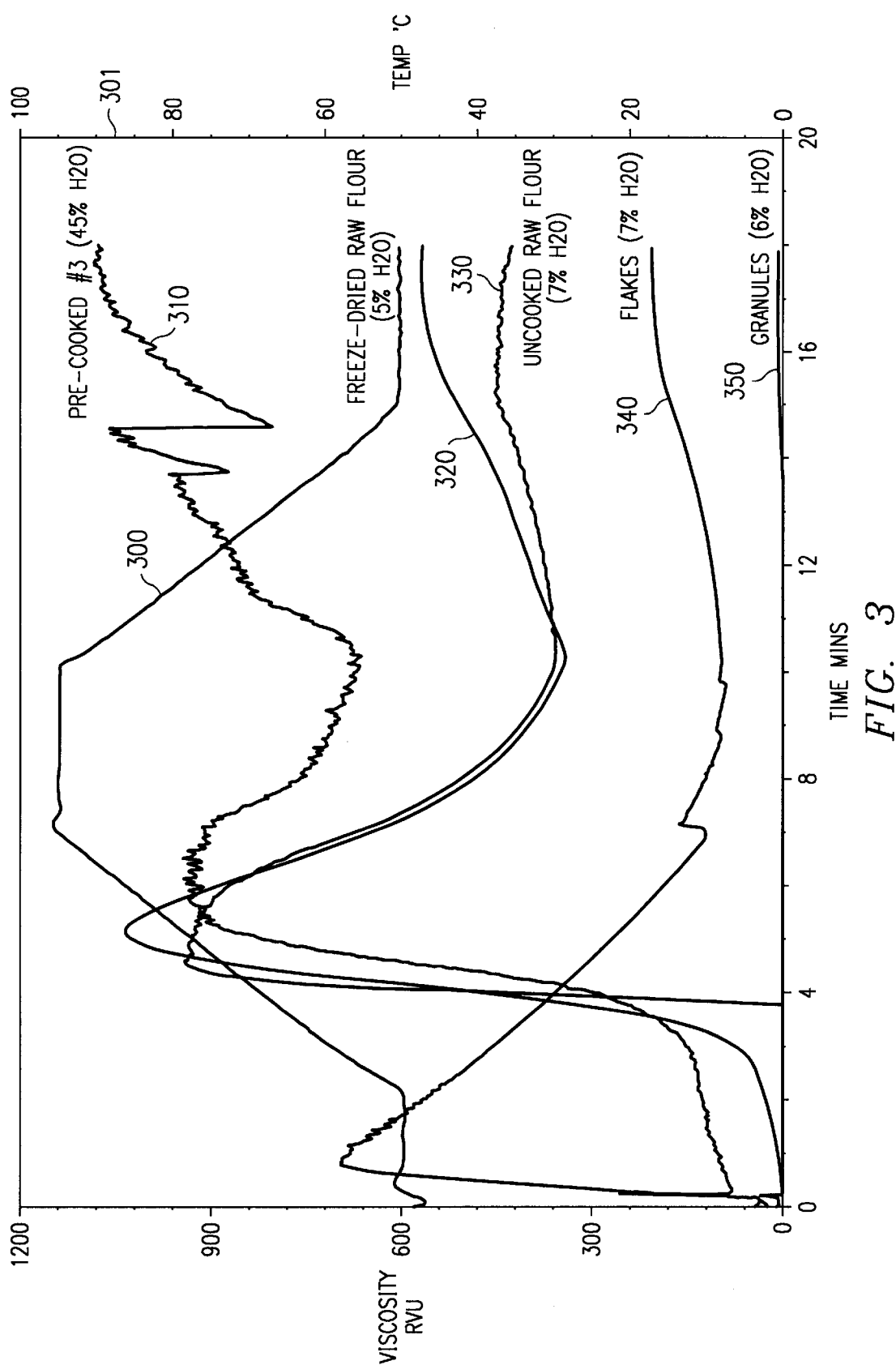
FIG. 3 is a chart showing the RVA profiles of one preferred embodiment of the product of the invention compared to the RVA profiles of prior art products.

FIG. 3 shows RVA profiles of one preferred product embodiment as compared to the RVA profiles of several prior art products. Again, FIG. 3 shows the method temperature profile 300 in reference to a temperature scale 301. The RVA profile 310 for the preferred embodiment sample refers to a pre-cooked Sample No. 3. Also shown is an RVA profile 320 for a freeze-dried raw flour sample, an RVA profile 330 for an uncooked raw flour sample, an RVA profile 340 for a potato flakes sample, and an RVA profile 350 for a potato granules sample.

The pre-cooked Sample No. 3 has been prepared as discussed above by cooking the potato stock to a moisture content of 45% and grinding the potato stock to a 40° C. end point temperature. After using the cooling steps described below, pre-cooked Sample No. 3 can be sheeted without requiring any additives. Consequently, the RVA profile 310 for pre-cooked Sample No. 3 represents the characteristics of the potato stock after grinding that would allow for a sheetable 100% potato product.

Figure 4:
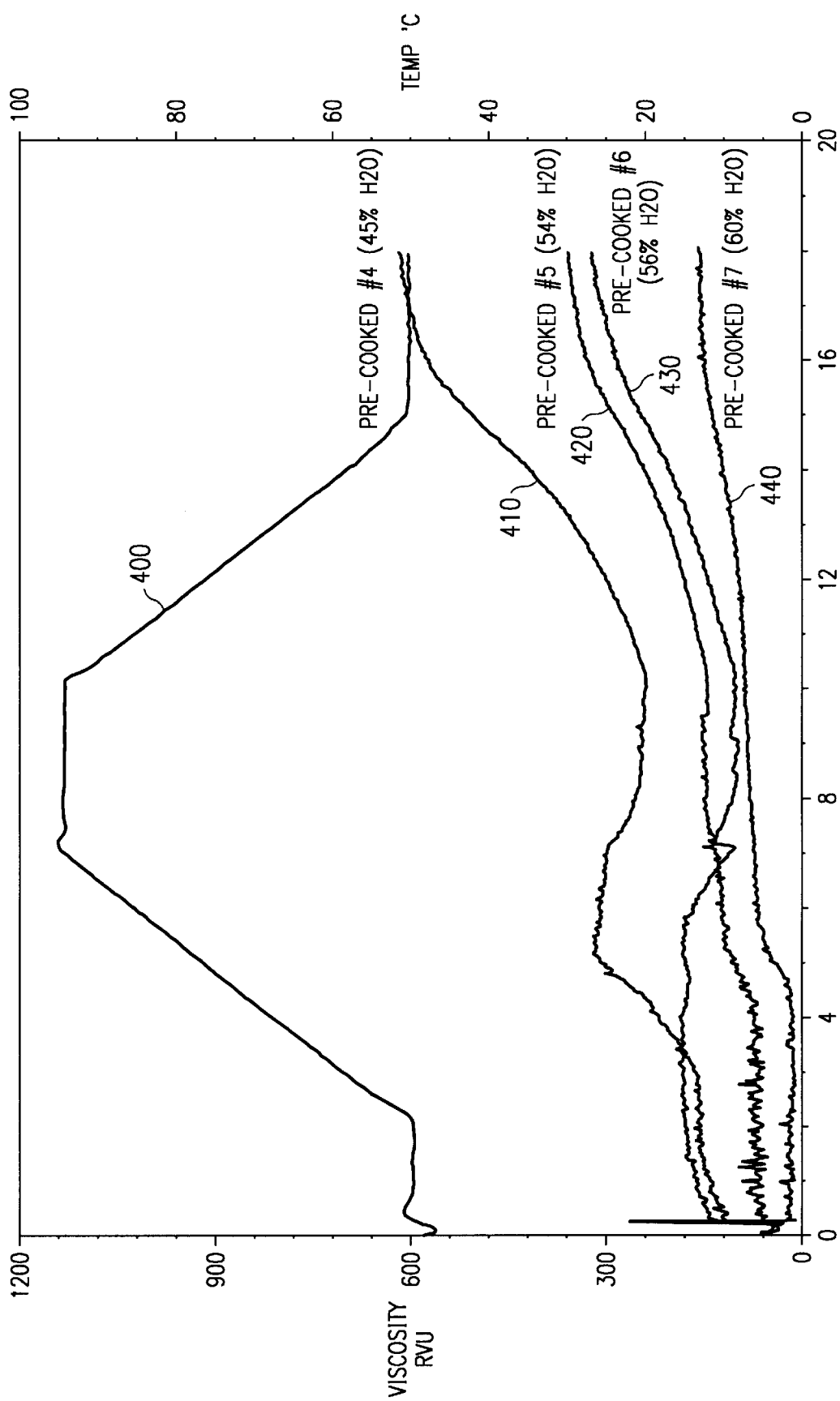
FIG. 4 is a chart showing the RVA profiles of various preferred embodiments products of the invention after the grinding step.

FIG. 4 shows four variants of potato stock samples prepared by the invention steps up to the grind step 112. Again shown is the temperature profile 400. The first RVA profile 410 shown in FIG. 4 relates to pre-cooked Sample No. 4. Sample No. 4 was cooked and dehydrated to a moisture content of 45% and then ground to an end point temperature of 60° C. The second RVA profile 410 relates to pre-cooked Sample No. 5. Sample No. 5 was cooked and dehydrated to a moisture content of 54% and ground to an end point temperature of 60° C. The third RVA profile 430 relates to pre-cooked Sample No. 6. Sample No. 6 was cooked and dehydrated to a moisture content of 56% and ground to an end point temperature of 60° C. The fourth RVA profile 440 relates to a pre-cooked Sample No. 7. Sample No. 7 was cooked and dehydrated to a moisture content of 60% and ground to an end point temperature of 55° C.

Unlike Sample No. 3 shown in FIG. 3, Samples 4, 5, 6, and 7 are not suitable for direct sheeting of the sheared potato stock without admixing additional components. However, such additional components, as described in more detail below, can be added to any of the samples shown in FIG. 4 to provide an acceptable finished product. The usage of any of the various pre-cooked samples is dependent upon the desired finished product flavor, texture, and appearance.

After the grind step 112, the potato stock is then subjected to a second cooling step 114. This second cooling step 114, in one embodiment, occurs over a 30–40 minute period in order to cool the potato stock to approximately 40° C. to 45° C.

Additives can be incorporated 116 into the potato stock. At this additive step 116, an optional emulsifier can be blended into the potato stock. In one embodiment, the emulsifier used contains oleic acid, and a suitable emulsifier in this regard has been found to be BFP 64K manufactured by American Ingredients of Kansas City, Mo. During the additive step 116, potato flakes or other starchy material can also be blended with the potato stock to obtain a desired processing consistency or to adjust flavor characteristics. Sugars, such as dextrose, sucrose, corn syrup, and salt can also be blended with the potato stock during the additive step 116, as necessary, for flavor and texture modification.

Controlling the expansion of the potato stock is the major concern with regard to the emulsifier discussed above. This can actually be accomplished by either the use of an emulsifier or by extending the cooling time at the first cooling step 110, the second cooling step 114, or at both cooling steps 110, 114. For example, in another embodiment that does not utilize an emulsifier, the first cooling step 110 can be extended to a period of one to twelve hours. One preferred embodiment uses an extended cooling period of three to six hours. In this instance, it is not necessary to elevate the temperature of the potato stock during the grind step 112. This extended cooling period can be reduced by coating the cut potatoes prior to the controlled dehydration step 108 with an oil. The goal of all of the various alternatives is to control the character of the dough to arrive at an ultimately sheetable dough product.

Returning to the embodiment illustrated in FIG. 1, the resultant mixture is next subjected to a mixing step 118. This mixing step 118 occurs over a short time period, for example, 30 seconds. The dough product is mixed 118 until it forms a particulate, as opposed to a lumpy, dough consistency. Water is added during the mixing step 118 to an end-point moisture level of the dough of approximately 35–45%.

The resultant dough is then subjected to further processing 120 using methods well-known in the art. For example, the dough could be sheeted to a desired thickness. The dough could then be cut to form and fried to an end-point moisture.

Numerous specific embodiments of the invention have been demonstrated, several of the more preferred of which are described below. Although these specific embodiments are disclosed as a series of batch steps, it is understood that each embodiment can be practiced in a continuous or semi-continuous process using methods currently available in the food processing industry.

PROCESS EXAMPLE I

A first specific embodiment (hereinafter "Example I") has been demonstrated using three different dough compositions, as detailed in the following Table 1. Example I starts with chip stock potatoes which are peeled using a Hobart peeler manufactured by the Hobart Corporation of Troy, Ohio. The peeled potatoes are cut into quarter-inch slabs using a hand slicer manufactured by Memco, Inc. of Hicksville, Ohio. The potato slabs are then hand-washed thoroughly and rinsed with water three times. The peeled and cut potatoes are submerged in water at all times prior to the dehydration process. The potato slabs are next placed on perforated trays immediately before loading the trays into an oven for the dehydration step. The load per tray is a total of 3.5 kg of potato slabs placed in a monolayer arrangement.

Three loads are baked and partially dehydrated by passing the trays through a gas fired oven such as a Cantrell International Model M970101 at 193° C. for a total residence time of 33 minutes. The finished moisture range at this stage is 52 to 54% compared to a starting moisture level of raw potato stock of about 80%.

The dehydrated potatoes are then cooled to ambient temperature in about 45 minutes. The cooled, dehydrated potatoes are next ground into a gel using a Stephan Vertical-Cutter/Mixer manufactured by the Stephan Machinery Corporation of Columbus, Ohio. Grind size per batch is 6.0 kg. Grinding is done intermittently for a total of 20 minutes at 30 to 60 second intervals to achieve a grinding finished temperature of 60° C. The potato gel is then allowed to cool for 45 minutes to about 30° C. and prepared into a potato dough by the addition of the pre-mixed dry ingredients listed in Table 1 below, which shows the dough compositions for three different mixtures (Examples Ia, Ib, and Ic) using the process described as Example I.

TABLE 1

Process Example I Dough Compositions

| Ingredients Formulation | Example Ia | Example Ib | Example Ic |
| --- | --- | --- | --- |
| Low Leach Potato Flakes (Magic Valley Foods Inc. MV004) | 0 | 13.1 | 27.8 |
| Potato Granules (Basic American Foods XL) | 0 | 3.3 | 2.8 |
| Chip Stock Potato (54% Moisture) | 66.4 | 65.7 | 41.4 |
| Pregel Wheat Starch (Midwest Grains Pregel 10) | 19.9 | 0 | 0 |
| Raw Wheat Starch (Midwest Grains Midsol 50) | 0 | 4.4 | 2.7 |
| Corn Syrup Solids (Grain Processing Co. M250) | 4.4 | 4.4 | 3.7 |
| Sucrose | 1.7 | 1.7 | 1.4 |
| Emulsifier (American Ingredients, BFP 64K) | 0.7 | 0.5 | 0.6 |
| Emulsifier (American Ingredients, Starplex 90) | 0 | 0 | 0 |
| Flour Salt | 0.2 | 0.2 | 0.2 |
| Dextrose | 0.1 | 0.1 | 0.1 |
| Water | 6.6 | 6.6 | 19.3 |
| Approx. Total Dough Wt. (kg) | 9.1 | 9.1 | 10.9 |
| Dough Moisture (%) | 43.9 | 44.2 | 42.9 |

The potato dough is mixed for a total of 45 seconds at 15 second intervals before the addition of water and for a total of 20 seconds after the addition of water at 10 second intervals. The dough is sheeted into a thin sheet of 0.025 inch thickness and then cut into oval pieces. These oval pieces are then form-fried in cottonseed oil at 182.2° C. for 12.5 seconds, thus producing a tasty potato-based snack.

PROCESS EXAMPLE II

A second specific embodiment (hereinafter "Example II") starts with chip stock potatoes which are peeled, cut, and washed as disclosed in Example I above. Potato slabs are then blanched at 87.8° C. for 45 seconds. The blanched potato slabs are immediately submerged in water and then placed on trays in a monolayer arrangement for a total of 3.0 kg of potato per tray. Three tray loads are dehydrated by passing the tray through a gas fired oven, again such as a Cantrell International Model M970101, at 215.6° C. for a total residence time of 25 minutes. The finished partial dehydration moisture level ranges from 45 to 48% compared to a starting moisture level for the raw potatoes of approximately 80%.

The dehydrated potatoes are then allowed to cool for 5 hours at ambient temperature. The cooled dehydrated potatoes are next ground as described in Example I. Grinding is done intermittently for a total of 5 minutes at 1 minute intervals to achieve a uniform particle size distribution. The potato particulate dough is sheeted into a thin sheet of 0.023 inch thickness and then cut into oval pieces without any additional dry ingredients or mixing. The cut pieces are then form-fried in cottonseed oil at 176.7° C. for 16 seconds, thus producing a tasty potato-based snack.

PROCESS EXAMPLE III

A third example of a specific embodiment (hereinafter "Example III") starts with table stock potatoes which are peeled, cut, washed, and blanched as detailed in Example II above. The blanched potato slabs are immediately submerged in water and then placed on trays in a monolayer arrangement with a total of 3.5 kg of potatoes per tray. The dehydration, cooling, grinding, dough preparation, sheeting, and form-frying steps for Example III are generally similar to those detailed in Example I above. However, the dough composition for three specific dough mixtures (Examples IIIa, IIIb, and IIIc) demonstrated using the Example III process are different, and are listed in Table 2 below. Further, Example III finished moisture contents for the dehydrated potato slabs are approximately 56 to 58% versus the 52 to 54% contents disclosed for Example I.

TABLE 2

Process Example III Dough Compositions

| Ingredients Formulation | Example IIIa | Example IIIb | Example IIIc |
| --- | --- | --- | --- |
| Low Leach Potato Flakes (Magic Valley Foods Inc. MV004) | 5.8 | 18.7 | 23.9 |
| Potato Granules (Basic American Foods XL) | 2.9 | 3.1 | 3.1 |
| Chip Stock Potato (54% Moisture) | 58.2 | 62.5 | 47.4 |
| Pregel Wheat Starch (Midwest Grains Pregel 10) | 17.5 | 0 | 0 |
| Raw Wheat Starch (Midwest Grains Midsol 50) | 3.9 | 4.2 | 4.2 |
| Corn Syrup Solids (Grain Processing Co. M250) | 2.9 | 2.1 | 3.2 |
| Sucrose | 1.6 | 1.7 | 1.7 |
| Emulsifier (American Ingredients, BFP 64K) | 1.1 | 1.2 | 0.9 |
| Emulsifier (American Ingredients, Starplex 90) | 0 | 0 | 0 |
| Flour Salt | 0.2 | 0.2 | 0.2 |
| Dextrose | 0.1 | 0.1 | 0.1 |
| Water | 5.8 | 6.2 | 15.3 |
| Approx. Total Dough Wt. (kg) | 10.3 | 9.6 | 9.5 |
| Dough Moisture (%) | 43.5 | 45.2 | 43.9 |

As will all the embodiments disclosed, the Example III dough product can be sheeted, cut, and fried or baked to an end point moisture level to produce a tasty potato-based snack.

The invention leads to a potato based snack produced from a sheetable potato dough which incorporates a raw potato product as a starting material. The incorporation of the raw potato product in a potato dough greatly enhances the potato flavor characteristics of the end snack product and results in a more natural potato product.

While the invention has been particularly shown and described with reference to a preferred embodiments, it will be understood by those skilled in the art that various changes in form and detail may be made therein without departing from the spirit and scope of the invention.

What is claimed is:

1. A method for making a potato dough comprising the steps of:
    (a) cutting raw potato stock;
    (b) baking and partially dehydrating said raw potato stock;
    (c) cooling said baked and partially dehydrated potato stock;
    (d) grinding said cooled potato stock to an end-point temperature to thus form a flowable gel;
    (e) cooling said gel; and
    (f) mixing said cooled gel with water to form a particulate dough.

2. The method of claim 1 wherein step (b) further comprises dehydrating said potato stock to a water content of between 30 and 70%.

3. The method of claim 2 wherein the heating of step (b) occurs at between 190° C. and 220° C. for between 15 and 35 minutes.

4. The method of claim 1 wherein step (c) further comprises cooling said potato stock for between 20 and 65 minutes to a resultant temperature of between 30° C. and 50° C.

5. The method of claim 1 wherein step (b) further comprises the heating of said potato stock for approximately 35 minutes to an end-point moisture level of approximately 45%.

6. The method of claim 1 wherein that step (d) further comprises grinding said potato stock to an end-point temperature of between 45° C. and 75° C.

7. The method of claim 1 wherein the grinding at step (d) comprises using a high-shear processor.

8. The method of claim 1 wherein step (e) further comprises cooling said flowable gel for approximately 20 to 45 minutes to an end-point temperature of approximately 35° C. to 50° C.

9. The method of claim 1 wherein an emulsifier is added to the flowable gel of step (e).

10. The method of claim 9 wherein the emulsifier comprises oleic acid.

11. The method of claim 1 wherein a starchy material is added to the flowable gel of step (e).

12. The method of claim 1 wherein a sugar is added to the flowable gel of step (e).

13. The method of claim 1 wherein corn syrup is added to said flowable gel of step (e).

14. The method of claim 1 wherein a salt is added to said flowable gel of step (e).

15. The method of claim 1 wherein step (f) further comprises mixing said flowable gel for less than one minute.

16. The method of claim 1 wherein water is added to said flowable gel at step (f) to an end-point water content of between 32 and 52%.

* * * * *